United States Patent [19]

Antberg et al.

[11] Patent Number: 5,262,498

[45] Date of Patent: Nov. 16, 1993

[54] METALLOCENE (CO)POLYMERS, PROCESS FOR THEIR PREPARATION AND THEIR USE AS CATALYSTS

[75] Inventors: Martin Antberg, Hofheim am Taunus; Hans-Friedrich Herrmann, Frankfurt am Main; Jürgen Rohrmann, Liederbach, all of Fed. Rep. of Germany

[73] Assignee: Hoechst Aktiengesellschaft, Frankfurt am Main, Fed. Rep. of Germany

[21] Appl. No.: 912,674

[22] Filed: Jul. 14, 1992

Related U.S. Application Data

[63] Continuation of Ser. No. 818,924, Jan. 10, 1992, abandoned.

[30] Foreign Application Priority Data

Jan. 12, 1991 [DE] Fed. Rep. of Germany ....... 4100761

[51] Int. Cl.$^5$ ............................................. C08F 30/04
[52] U.S. Cl. .................................... 526/241; 502/117; 502/159; 526/160; 526/170
[58] Field of Search ....................... 526/160, 170, 241; 502/117, 159

[56] References Cited

U.S. PATENT DOCUMENTS

| | | | |
|---|---|---|---|
| 4,522,982 | 6/1985 | Ewen | 525/240 |
| 4,542,199 | 9/1985 | Kaminsky et al. | 526/160 |
| 4,613,670 | 9/1986 | Schroeder et al. | 549/211 |
| 5,071,808 | 12/1991 | Antberg et al. | 502/117 |

FOREIGN PATENT DOCUMENTS

| | | |
|---|---|---|
| 0128045 | 12/1984 | European Pat. Off. . |
| 0206794 | 12/1986 | European Pat. Off. . |
| 0277003 | 8/1988 | European Pat. Off. . |
| 0277004 | 8/1988 | European Pat. Off. . |
| 0293815 | 11/1990 | European Pat. Off. . |
| 3840772 | 6/1990 | Fed. Rep. of Germany . |

OTHER PUBLICATIONS

Pittman, Jr., C. U. et al., *Pure & Appl. Chem.* 58:617–622 (1986).

*Primary Examiner*—Joseph L. Schofer
*Assistant Examiner*—David Wu

[57] ABSTRACT

An immobile (heterogeneous) metallocene catalyst component which can advantageously be used for olefin polymerization is obtained by homopolymerization of appropriately substituted (vinyl group-containing) metallocenes of group IVb of the periodic table or by copolymerization of such metallocenes with (di)-vinylaromatic compounds.

6 Claims, No Drawings

METALLOCENE (CO)POLYMERS, PROCESS FOR THEIR PREPARATION AND THEIR USE AS CATALYSTS

This application is a continuation of application Ser. No. 07/818,924 filed on Jan. 10, 1992 now abandoned.

The present invention primarily relates to a process for the preparation of an immobile (heterogeneous) metallocene catalyst component by homopolymerization of metallocenes containing vinyl functional groups or by copolymerization of such metallocenes with (di)-vinylaromatic compounds. The polymers prepared in this way have advantageous properties as catalysts in olefin polymerization.

Metallocenes of transition metals are known as catalyst components (cf. U.S. Pat. No. 4,522,982, U.S. Pat. No. 4,542,199 and EP-A 128045). Together with aluminoxanes they form homogeneous transition metal catalysts which are soluble in aromatic and aliphatic hydrocarbons. These catalysts are highly active. Together with salts of non-coordinating anions, metallocenes also form an active system for olefin polymerization (cf. EP-A 277 003/4).

However, soluble catalysts have disadvantages if they are to be used in existing industrial plants, since the latter are as a rule equipped for the use of heterogeneous catalyst systems.

Metallocene catalysts in which a zirconocene or titanocene component and an aluminoxane are applied conjointly from a solution to a silicate support have also been disclosed (cf. EP-A 206 794). However, this catalyst system has low activity. Moreover, the catalyst components are not anchored sufficiently firmly to the support and can thus be extracted during the polymerization.

It is also known that metallocene compounds containing silyl ether radicals can be applied to silicate supports with the formation of siloxane bridges (cf. EP-A 293 815).

For this purpose it is necessary to remove the water bonded by adsorption to the support material by drying for several hours at a temperature of at most 800° C.

It is also known that a heterogeneous metallocene catalyst is obtained if a metallocene compound containing olefin groups is reacted with a poly(methylhydrogenosiloxane) under hydrosilylation catalysis (cf. DE-OS (German Offenlegungsschrift) 38 40 772).

These polymerization catalysts are distinguished by only moderate polymerization activity, especially in comparison with their soluble precursors.

In Pure and Appl. Chem., Vol. 58 (1986) 617°-622 the copolymerization of (Cp-vinyl) CpTiCl$_2$ (Cp=cyclopentadienyl) and the like with vinylbenzene is described. There is no indication of a possible use of the reaction product as a catalyst. Experiments have shown that titanocene-based copolymers of this type have only a low polymerization activity.

The object was, therefore, to find a catalyst system which is insoluble in conventional solvents—including aromatic solvents—but nevertheless has a high polymerization activity.

It has been found that the abovementioned disadvantages can be overcome if a zirconocene or hafnocene containing vinyl functional groups is polymerized, optionally together with a (di)vinyl-aromatic compound, and the resulting polymer is used as polymerization catalyst.

The present invention therefore relates to a process for the preparation of an immobile metallocene catalyst component, wherein a metallocene of formula I

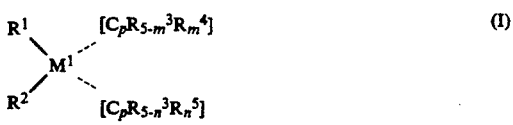

and/or of formula II

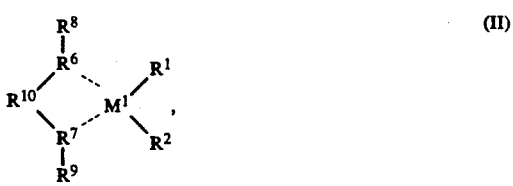

in which $M_1$ is zirconium or hafnium and

Cp is a cyclopentadienyl radical, $R^1$ and $R^2$ are identical or different and are a hydrogen atom, a halogen atom, a $C_1$–$C_{10}$-alkyl group, a $C_1$–$C_{10}$-alkoxy group, a $C_7$–$C_{20}$-arylalkyl group, a $C_6$–$C_{10}$-aryl group or a $C_6$–$C_{10}$-aryloxy group, and $R^1$ and $R^2$ can also be linked to one another and together with $M^1$ can form a metallo ring, the radicals $R^3$ are identical or different and are a hydrogen atom, a halogen atom, a $C_1$–$C_{10}$-alkyl group, a $C_6$–$C_{10}$-aryl group, a $C_7$–$C_{20}$-arylalkyl group, a $C_1$–$C_{10}$-fluoroalkyl group or an organometallic radical, such as a $C_1$–$C_{10}$-trialkylsilyl, $C_6$–$C_{10}$-aryl-$C_1$–$C_{10}$-dialkylsilyl, $C_1$–$C_{10}$-alkyl-$C_6$–$C_{10}$-diarylsilyl or $C_6$–$C_{10}$-triarylsily, $R^4$ and $R^5$ are identical or different and are a vinyl group, a $C_6$–$C_{18}$-arylvinyl group, a $C_1$–$C_8$-alkylvinyl group or a $C_6$–$C_{18}$-vinylaryl group, all of which may be substituted, $R^6$ and $R^7$ are identical or different and are a cyclopentadienyl, indenyl or fluorenyl radical, it being possible for said rings together with $M^1$ to form a sandwich structure, $R^8$ and $R^9$ are identical or different, are substituents of $R^6$ and $R^7$ and have the meanings given for $R^3$, $R^4$ and $R^5$, with the proviso that $R^6$ and $R^7$ can be monosubstituted or polysubstituted by $R^8$ or $R^9$, but at least one ring $R^6$ or $R^7$ must carry at least one radical $R^8$ or $R^9$ having the meaning of $R^4$ and $R^5$, and $R^{10}$ has the meaning shown in formulae III-VII

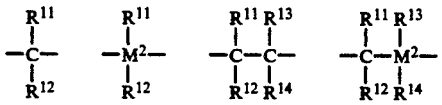

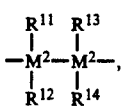

(VII)

where $M^2$ is silicon, germanium or tin and $R^{11}$, $R^{12}$, $R^{13}$ and R are identical or different and are a hydrogen atom, a halogen atom, a $C_1$–$C_{10}$-alkyl group, a $C_1$–$C_{10}$-fluoroalkyl group, a $C_6$–$C_{10}$-aryl group, a $C_6$–$C_{10}$-fluoroaryl group, a $C_1$–$C_{10}$-alkoxy group, a $C_6$–$C_{10}$-aryloxy group or a $C_7$–$C_{20}$-arylalkyl group, $R^{11}$ and $R^{12}$, $R^{13}$ and $R^{14}$, $R^{11}$ and $R^{13}$ or $R^{12}$ and $R^{14}$ together with the atoms linking them can form a ring system and m and n are identical or different and are a number from 0 to 5, where m+n must be $\geq 1$, is homopolymerized or copolymerized, or a compound of formula I and-/or of formula II is copolymerized with a (di)vinyl-aromatic compound.

The immobile metallocene catalyst components prepared by the process according to the invention are novel and are likewise a subject of this invention.

Metallocene catalyst component according t the invention thus signifies:

a) homopolymers of compounds I and II, b) copolymers of one or more compounds I and one or more compounds II, c) copolymers of one or more compounds I and one or more (di)vinyl-aromatic compounds, d) copolymers of one or more compounds II and one or more (di)vinyl-aromatic compounds, and e) copolymers of one or more compounds I and II and one or more (di)vinyl-aromatic compounds.

Preferably, in formulae I and II $R^1$ and $R^2$ are identical or different and are a hydrogen atom, a halogen atom, a $C_1$–$C_4$-alkyl group, a $C_1$–$C_4$-alkoxy group, a $C_7$–$C_{14}$-arylalkyl group, a $C_6$–$C_{10}$-aryl group or a $C_6$–$C_{10}$-aryloxy group, and $R^1$ and $R^2$ can also be linked to one another and together with $M^1$ can form a metallo ring, the radicals $R^3$ are identical or different and are a hydrogen atom, a halogen atom, a $C_1$–$C_4$-alkyl group, a $C_6$–$C_{10}$-aryl group, a $C_7$–$C_{14}$-arylalkyl group, a $C_1$–$C_6$-fluoroalkyl group or an organometallic radical, such as $C_1$–$C_{10}$-trialkylsilyl, $C_6$–$C_{10}$-aryl-$C_1$–$C_6$-dialkylsilyl, $C_1$–$C_4$-alkyl-$C_6$–$C_{10}$-diarylsilyl or $C_6$–$C_{10}$-triarylsilyl, $R^4$ and $R^5$ are identical or different, preferably identical, and are a vinyl group, a $C_6$–$C_{18}$-arylvinyl group, a $C_1$–$C_8$-alkylvinyl group or $C_6$–$C_{18}$-vinylaryl group, which groups may be substituted by a $C_1$–$C_4$-alkoxy group, $C_1$–$C_4$-alkyl group or OH group, $R^6$ and $R^7$ are identical or different and are a cyclopentadienyl, indenyl or fluorenyl radical, it being possible for said rings together with $M^1$ to form a sandwich structure, $R^8$ and $R^9$ are identical or different, are substituents of $R^6$ and $R^7$ and have the meanings given for $R^3$, $R^4$ and $R^5$, with the proviso that $R^6$ and $R^7$ can be monosubstituted or polysubstituted by $R^8$ or $R^9$, but at least one ring $R^6$ or $R^7$ must carry at least one radical $R^8$ or $R^9$ having the meaning of $R^4$ and $R^5$, and $R^{10}$ has the meaning shown in formulae III–VII, where $M^2$ is silicon or germanium and $R^{11}$, $R^{12}$, $R^{13}$ and $R^{14}$ are identical or different and are a hydrogen atom, a halogen atom, a $C_1$–$C_6$-alkyl group, a $C_1$–$C_6$-fluoroalkyl group, a $C_6$–$C_{10}$-aryl group, a $C_6$–$C_{10}$-fluoroaryl group, a $C_1$–$C_6$-alkoxy group, a $C_6$–$C_{10}$-aryloxy group or a $C_7$–$C_{14}$-arylalkyl group, $R^{11}$ and $R^{12}$, $R^{13}$ and $R^{14}$, $R^{11}$ and $R^{13}$ or $R^{12}$ and $R^{14}$ together with the atoms linking them can form a ring system, and m and n are identical or different and are a number from 0 to 5, where m+n must be $\geq 1$.

In particular, $R^1$ and $R^2$ are identical or different and are a hydrogen atom, a halogen atom, a $C_1$–$C_4$-alkyl group or a $C_6$–$C_{10}$-aryl group, and $R^1$ and $R^2$ can also be linked to one another and together with $M^1$ can form a metallo ring, the radicals $R^3$ are identical or different and are a hydrogen atom, a halogen atom, a $C_1$–$C_4$-alkyl group, a $C_6$–$C_{10}$-aryl group or an organometallic radical, such as $C_1$–$C_{10}$-trialkylsilyl, $R^6$ and $R^7$ are a cyclopentadienyl radical, and $R^{10}$ has the meaning shown in formulae III–V, where $M^2$ is silicon and $R^{11}$, $R^{12}$, $R^{13}$ and $R^{14}$ are identical or different and are a hydrogen atom, a halogen atom, a $C_1$–$C_6$-alkyl group or a $C_6$–$C_{10}$-aryl group, and $R^{11}$ and $R^{12}$, $R^{13}$ and $R^{14}$, $R^{11}$ and $R^{13}$ or $R^{12}$ and $R^{14}$ together with the atoms linking them can form a ring system.

$R^{10}$ is preferably a dialkylsilyl group or a 1,2-alkanediyl group, in particular a dimethylsilyl group or 1,2-ethanediyl group.

$R^{11}$ and $R^{12}$ or $R^{13}$ and $R^{14}$ can be linked to one another with the formation of spirocyclic systems such as

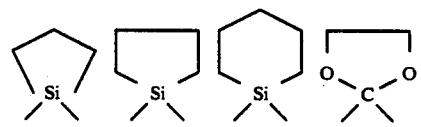

in the same way as $R^{11}$ and $R^{13}$ or $R^{12}$ and $R^{14}$ can form the following ring system

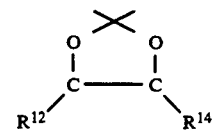

Examples of suitable metallocenes of formula I are:

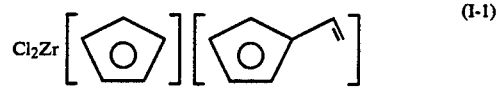
(I-1)

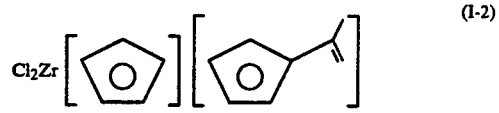
(I-2)

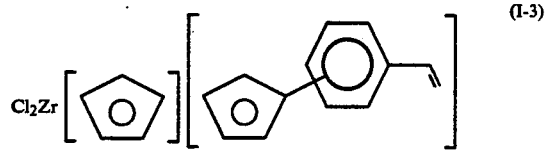
(I-3)

(I-4)

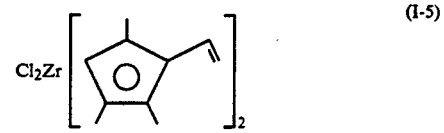
(I-5)

-continued

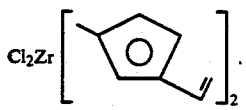 (I-6)

Examples for formula II are:

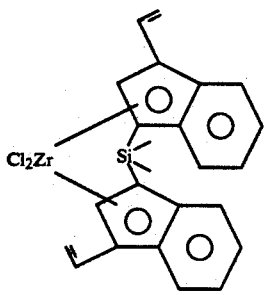 (II-1)

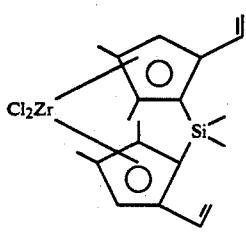 (II-2)

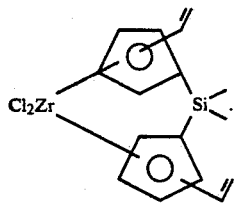 (II-3)

(Substituent " 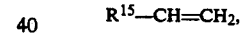 " is a methyl group).

The preparation process for the metallocenes described are known in principle; cf. Journal of Organometallic Chem. 288 (1985) 63–67, EP-A 320 762 and the illustrative embodiments.

Examples of (di)vinyl-aromatic compounds to be used according to the invention for copolymerization are: 4-vinylanisole, 9-vinylanthracene, 4-ethoxystyrene, vinylmesitylene, 2-, 3- or 4-vinyltoluene, styrene, 4-vinylbiphenyl, 4-vinylveratrole, 2-vinylnaphthalene and divinylbenzene, in particular styrene (vinylbenzene), or mixtures thereof. Divinylbenzene is preferably employed if crosslinking is desired during the polymerization. These substances ar commercially available.

If the metallocene compounds I and/or II are polymerized with vinylbenzene and divinylbenzene, they contain at least one vinyl group. If the compounds I and/or II are copolymerized with vinylbenzene but without divinylbenzene, they must then have at least 2 vinyl groups.

The (co)polymerization can take place either by the action of heat (without free radical initiator) or (preferably) by free radical catalysis. In the latter case, free radical forming agents are added in catalytically effective amounts to the reaction mixture. The suitability of a substance as a catalyst (free radical forming agent) for the process according to the invention results in particular from its half life at a given temperature. α,α'-Azoisobutyronitrile is preferably used. However, numerous compounds from the substance category comprising organic peroxides are also suitable for the said purpose.

Examples of such compounds are: tert-butyl perbenzoate, 2,2-bis-(butylperoxy)butane, di-tert-butyl diperphthalate, tert-butyl perisononanate, tert-butyl peracetate, 2,5-dimethylhexane 2,5-diperbenzoate, 3,5,5-trimethylcyclohexanone perketal, mono-tert-butyl permaleate, tert-butyl perisobutyrate, p-chlorobenzoyl peroxide, tert-butyl peroctoate, benzoyl peroxide, diacetyl peroxide, succinyl peroxide, propionyl peroxide, capryloyl peroxide, lauroyl peroxide, decanoyl peroxide, isononanoyl peroxide, tert-butyl perpivalate or 2,4-dichlorobenzoyl peroxide.

For polymerization, the reactants are introduced into a hydrocarbon, preferably into an aromatic hydrocarbon, in particular toluene or xylene, and heated for 1 to 24 h, preferably 4 to 10 h, at 60°–140° C., preferably 80°–90° C., and 0.1 g portions of α,α'-azo-isobutyronitrile are added 1 to 4 times during the reaction. The supernatant is decanted off from the resulting polymer, which is swollen in aromatic solvents, and the product is washed with the solvent used and then dried under vacuum. The residue is washed several times with saturated hydrocarbon, preferably n-hexane or n-pentane, and dried under vacuum.

The vinylmetallocenes of formulae I or II can also readily be homopolymerized by the action of heat (without a free radical initiator). This can be carried out in a high-boiling inert solvent, such as n-octane or xylene, or also, preferably, without a solvent. With this procedure a solid is formed which is insoluble in hydrocarbons.

The homopolymers or copolymers according to the invention can advantageously be used as catalysts for the polymerization of 1-olefins of the formula $$R^{15}-CH=CH_2,$$

in which $R^{15}$ is hydrogen or a straight-chain or branched alkyl group, preferably ethylene, propylene or 4-methylpent(1)-ene.

In addition, the catalyst can also be used for the polymerization of cyclic olefins, such as cyclopentene, cyclohexene or norbornene, diolefins and cyclic diolefins.

It is also possible to copolymerize several olefins of the abovementioned formula or cycloolefins with one another.

For the preparation of polyolefins, a catalyst system is preferably used which, in addition to the metallocene polymer according to the invention, comprises an aluminoxane as cocatalyst. The preparation and the use of such aluminoxanes are known (S. Pasynkiewicz, Polyhedron 9 (1990) 429 and EP-A 302 424).

It is also possible to use a salt-like compound of the formula $R_xNH_{4-x}BR'_4$ or of the formula $R^3PHBR'_4$ as cocatalyst instead of (or in addition to) an aluminoxane. In these formulae x is 1, 2 or 3, R is alkyl or aryl, which may be identical or different, and R' is aryl, which may also be fluorinated or partially fluorinated. In this case, the catalyst consists of the reaction product of the metallocene polymer with one of the said compounds (cf. EP-A 277 004).

Furthermore, the metallocene polymer described above can also be reacted with an alkylating agent, such as a Grignard or lithium compound, in particular Li aluminoalkyl and especially methyllithium. This reaction is of course not required in the case of compounds of formulae I or II which are already appropriately substituted. The product of this reaction is then reacted with the said salt of a non-coordinating anion.

In all cases, an immobile (heterogeneous) catalyst system of high polymerization activity is obtained which can advantageously be used for olefin polymerization.

The examples which follow are intended to illustrate the invention in more detail.

EXAMPLE 1

$Cl_2ZrCp(Cp\text{-vinyl})$ 5.29 g (57.4 mmol) of 6-methylfulvene were dissolved in 100 cm$^3$ of THF and 38.3 cm$^3$ of a 1.5M (57.43 mmol) lithium diisopropylamide/THF complex solution in cyclohexane were added dropwise in the course of 1 h and the mixture was stirred for 2 h at RT. After filtering, the filtrate was evaporated and the Li$^⊕$ (Cp-vinyl)$^⊖$ content was determined by NMR spectroscopy and found to be about 85%; the remainder was adhering solvent. The yield was 6.27 g (about 95%).

1.13 g (85% pure—11.52 mmol) of Li (Cp-vinyl), dissolved in 30 cm$^3$ of THF, were added in the course of 15 min at $-78°$ C. to a suspension of 3.03 g (11.53 mmol) of Cl$_3$CpZr in 30 cm$^3$ of THF. After warming to RT, the mixture was stirred for a further 3 h and the clear yellow solution was evaporated. The residue was stirred with 20 cm$^3$ of n-pentane and the mixture evaporated again. After stirring with toluene, the mixture was filtered, the solvent was stripped off and n-pentane was added and, after digestion, stripped off. After taking up in CHCl$_3$, the mixture was filtered and the filtrate was evaporated and digested with n-pentane, whereupon the oily residue solidified, and the product was filtered off and dried.

Yield: 2.38 g (7.48 mmol—64.8%) of (Cp)(Cp-vinyl)ZrCl$_2$.

The product obtained had the NMR spectrum to be expected (100 MHz, CDCl$_3$): $\delta = 5.35$ (dd, 1H, $J_{cis}$32 11, $J_{gem} = 1$ Hz), 5.58 (dd, 1H, $J_{trans} = 18$ Hz), 6.33–6.53 (m, 9H, Cp-H), 6.58 (dd, 1H).

EXAMPLE 2

Homopolymerization of $Cl_2ZrCp(Cp\text{-vinyl})$ 0.34 g (1.07 mmol) of the complex from Example 1 were dissolved in 10 cm$^3$ of toluene, 0.1 g of $\alpha,\alpha'$-azoisobutyronitrile (AIBN) was added and the mixture was stirred for 2 h at 90° C. A greenish solid formed, which was filtered off and washed with solvent. After drying, 0.11 g of product was obtained; the Zr content was 22.5%.

EXAMPLE 3

Hompolymerization of $Cl_2ZrCp(Cp\text{-vinyl})$ 0.25 g (0.79 mmol) of the complex from Example 1 was dissolved in 10 cm$^3$ of toluene, 0.1 g of AIBN was added and the mixture was stirred for 4 h at 100° C.; after adding a further 0.1 g of AIBN, the mixture was stirred for a further 6 h at this temperature and the brownish precipitate was filtered off, washed and dried. The 0.18 g of product contained 24% Zr.

EXAMPLE 4

$Cl_2Zr(Cp\text{-vinyl})_2$ 1.54 g (85% pure—14 mmol) of Li(Cp-vinyl) in 100 cm$^3$ of THF were added in portions at $-78°$ C. to 2.58 g (6.84 mmol) of Cl$_4$Zr(thf)$_2$ in 50 cm$^3$ of THF. After warming to $-20°$ C., the solvent was stripped off in the course of 1 h at RT. The yellow-orange evaporation residue was extracted with a total of 300 cm$^3$ of n-hexane/toluene 2:1 (vol) in portions and the extracts were filtered off and evaporated. n-Pentane and a few cm$^3$ of toluene were added to the residue and after filtering, the filtrate was evaporated and extracted with a little n-pentane. A whitish residue remains, which was dried under vacuum.

Yield: 0.37 g (1.03 mmol—15%) of (Cp-vinyl)$_2$ZrCl$_2$

The compound had the correct elementary analysis.

EXAMPLE 5

$Me_2ZrCp(Cp\text{-vinyl})$ 1.75 cm$^3$ of a 1.6N (2.8 mmol) ethereal methyllithium solution were added dropwise at $-50°$ C. to 0.4 g (1.26 mmol) of the complex from Example 1 in 10 cm$^3$ of Et$_2$O and the mixture was stirred for 1 h at 0° C. After replacing the solvent by n-pentane, the mixture was stirred for a further 1 h at RT and evaporated and the residue was extracted with toluene. A white evaporation residue then remains.

Yield: 0.2 g (0.72 mmol—57%) of (Cp)(Cp-vinyl)ZrMe$_2$.

The NMR spectrum shows the integration ratio of 2:1 to be expected for aromatic compounds—to saturated hydrocarbon H.

EXAMPLE 6

$Cl_2Zr(Me_2,\text{vinyl-Cp})_2SiMe_2$ 12.7 cm$^3$ of 1.6N (20.3 mmol) ethereal methyllithium were added dropwise to 3 g (10.1 mmol) of (2,3-Me$_2$-5-vinyl-C$_5$H$_2$)$_2$SiMe$_2$ in 50 cm$^3$ of Et$_2$O and the mixture was then stirred for 2 h at about 35° C. The solvent was then stripped off. 2.35 g (10.1 mmol) of ZrCl$_4$ were suspended in 100 cm$^3$ of CH$_2$CCl$_2$ at $-78°$ C. and the evaporation residue described above was added to the suspension. The mixture was slowly warmed to 0° C. and stirred for 1 h at this temperature and, after filtering, the solvent was stripped off. The filtered and evaporated toluene extract was examined by NMR spectroscopy. It shows a complex mixture.

Yield: 0.87 g (2.19 mmol—22%) of rac/meso-{(2,3-Me$_2$-5-vinyl-C$_5$H$_2$)$_2$SiMe$_2$}ZrCl$_2$.

EXAMPLE 7

Copolymerization of $Cl_2ZrCp(Cp\text{-vinyl})$

A mixture of 0.1 g (0.31 mmol) of the abovementioned complex and 5 cm$^3$ of vinylbenzene was stirred for 6 h at 60° C. in 50 cm$^3$ of toluene/n-hexane (1:4 by volume) with the addition of 0.15 mg of AIBN. After very slight formation of solid, the mixture was evaporated, the residue taken up several times in toluene and the solvent stripped off again. The NMR spectrum of the final residue shows no further vinyl groups.

Yield: 3.4 g of copolymer; Zr content: 0.88%.

EXAMPLE 8

Terpolymerization of Cl$_2$ZrCp(Cp-vinyl)

0.2 g (0.63 mmol) of the abovementioned complex, 0.5 cm$^3$ of divinylbenzene and 8.5 cm$^3$ of vinylbenzene were stirred in 15 cm$^3$ of toluene with 0.1 g of AIBN for 2 h at 80° C. After adding a further 20 cm$^3$ of solvent, the gelatinous mass was stirred for a further 3 h at this temperature. After evaporation, the residue was washed thoroughly with n-pentane and dried.

Yield: 4.57 g; Zr content 0.94%.

EXAMPLE 9

Terpolymerization of Cl$_2$ZrCp(Cp-vinyl)

0.25 g (0.79 mmol) of the complex from Example 1, 1 cm$^3$ of divinylbenzene and 8.5 cm$^3$ of vinylbenzene were stirred in 15 cm$^3$ of toluene with 0.1 g of AIBN at 80° C. After 2 h, the gelatinous mass was diluted with 15 cm$^3$ of toluene and stirred for a further 2 h at the above temperature. The subsequent procedure corresponded to that of Example 8.

Yield: 3.74 g; Zr content: 1.2%.

EXAMPLE 10

Copolymerization of (Cp-vinyl)$_2$ZrCl$_2$ 0.2 g (0.56 mmol) of the abovementioned compound and 5 cm$^3$ of vinylbenzene were stirred in 20 cm$^3$ of toluene with 0.1 g of AIBN at 75° C. for 5 h. After evaporation, the resulting mass was washed with n-pentane and dried. A little vinylbenzene was still discernible in the NMR spectrum, but no vinyl signals from the metallocene compound.

Yield: 3 g; Zr content 1.5%.

EXAMPLE 11

Terpolymerization of Me$_2$ZrCp(CP-vinyl)

0.1 g (0.36 mmol) of the abovementioned complex, 0.5 cm$^3$ of divinylbenzene and 5 cm$^3$ of vinylbenzene were stirred in 15 cm$^3$ of toluene with 0.1 g of AIBN at 80° C. for 4 h. The gelatinous product was filtered off, washed and dried.

Yield: 3.7 g; Zr content: 0.7%.

EXAMPLE 12

Terpolymerization of [(2,3-Me$_2$-5-vinyl-C$_5$H$_2$)$_2$SiMe$_2$]ZrCl$_2$ 0.22 g (0.51 mmol) of the said complex, 1 cm$^3$ of divinylbenzene and 8 cm$^3$ of vinylbenzene were stirred in 30 cm$^3$ of toluene with 0.1 g of AIBN at 85° C. for 7 h. After evaporation and thorough washing of the residue with n-pentane, the product was dried.

Yield: 4.2 g; 1% Zr content.

EXAMPLE 13

Hompolymerization of Cl$_2$ZrCp(Cp-vinyl) without solvent (by the action of heat)

0.24 g (0.75 mmol) of the said compound was heated at 115° C. for 1 h in a Schlenk vessel. During this period the substance assumes a darker color. The substance was then extracted with toluene and filtered off. 0.19 g of product having a Zr content of 23% was obtained.

EXAMPLE 14

Reaction of a metallocene polymer with a cocatalyst 2 g of the product from Example 11 were suspended in 10 cm$^3$ of toluene and 0.13 g (0.15 mmol) of [Bu$_3$NH][B(C$_6$F$_{54}$)] was added to the suspension at 0° C. and the mixture was stirred for 1 h. The supernatant was removed from the dark colored mixture by decanting and the product was washed with solvent and then dried under vacuum.

Yield: 1.87 g; Zr content: 0.6%.

EXAMPLE 15

Reaction of a metallocene polymer with an alkylating agent and a cocatalyst 2 g of the product from Example 10 were suspended in 25 cm$^3$ of Et$_2$O and 0.4 cm$^3$ of a 1.5N (0.64 mmol) ethereal MeLi solution was added at −20° C., the mixture was stirred for 1 h at 0° C. and filtered, the solvent was replaced by 20 cm$^3$ of toluene and 0.12 g (0.21 mmol) of [Bu$_3$NH][B-(p-tolyl)$_4$] was added. After stirring for 1 h, the product was filtered off, washed and dried.

Yield: 0.19 g; Zr content: 1.3%.

Olefin polymerization using a metallocene monomer as catalyst

EXAMPLE 16

900 cm$^3$ of a diesel oil fraction (b.p.: 100°–120° C.) were initially introduced into a 1.5 dm$^3$ reactor and heated to 70° C. The reactor was charged with 13 mmol of a 10% strength toluene solution of methylaluminoxane and 1 μmol of catalyst (from Example 1). Ethylene was then injected until a final pressure of 7 bar was reached and the mixture was polymerized for 2 h. Aqueous HCl was then added to the polymer solution. The polymer was isolated, washed with acetone and dried under vacuum. 82.7 g of polyethylene were obtained, corresponding to an activity of 41.4 kg of polymer/mmol Zr·h (see table for further data).

EXAMPLE 17

The procedure was as in Example 16. The polymerization catalyst contained the metallocene monomer from Example 4. 78.9 g of polymer were obtained. This corresponds to a yield of 39.5 kg of polyethylene/mmol Zr·h (see table for further data).

Olefin polymerization using metallocene polymers as catalyst

EXAMPLE 18

The procedure was as in Example 16. The catalyst used was the product from Example 7 (0.001 mmol Zr). 72 g of polyethylene were obtained, corresponding to 36 kg of polymer/mmol Zr·h (see table for further data).

EXAMPLE 19

The polymerization was carried out as in Example 16. The amount of catalyst according to Example 10 which was employed corresponded to 0.0005 mmol Zr. 27.1 g of polyethylene were obtained. This corresponds to 27.1 kg of polymer/mmol Zr·h (see table for further data).

EXAMPLE 20

The procedure was as in Example 16, except that the catalyst from Example 8 was used (0.5 μmol Zr). The yield after 2 h was 52.6 g of polyethylene having a VI of 620 cm$^3$/g (see table).

EXAMPLE 21

The procedure was as in Example 16, except that the catalyst from Example 9 was used (0.2 μmol Zr). The yield after 2 h was 32.2 g of polyethylene having a VI of 671 cm$^3$/g (see table).

EXAMPLE 22

900 cm$^3$ of a diesel oil fraction (b.p.: 100°–120° C.) and 0.015 g (corresponding to 0.001 mmol Zr) of catalyst from Example 14 were initially introduced into a 1.5 dm$^3$ reactor and heated to 70° C. After injecting ethylene until a final pressure of 7 bar was reached, polymerization was carried out for 2 h. After decomposition with HCl, the product was washed with acetone and dried. 63.7 g of polyethylene were obtained, corresponding to 31.9 kg of polymer/mmol Zr·h (see table for further data).

EXAMPLE 23

The procedure was as in Example 22, but the catalyst originated from Example 15 and the yield of polyethylene was 68.0 g. This corresponds to an activity of 34 g of polymer/mmol Zr·h (see table for further data).

EXAMPLE 24

After flushing with nitrogen, a dry 16 dm$^3$ reactor was filled with 10 dm$^3$ of liquid propylene. 40 mmol of a toluene solution of methylaluminoxane were then added and the mixture was stirred for 15 min at 30° C.

In parallel with this, a mixture of 0.05 mmol of metallocene according to Example 6 and 20 mmol of a toluene solution of methylaluminoxane was prepared and preactivated by leaving to stand for 15 minutes.

This mixture was then added to the reactor, the reaction mixture was heated to 70° C. and the polymerization was started. After 1 h the reaction was stopped by cooling and releasing pressure. 2.39 kg of polypropylene were obtained. This corresponds to 47.8 kg/mmol Zr·h (see table for further data).

EXAMPLE 25

The procedure was as in Example 24. However, the catalyst used was 0.05 mmol of metallocene polymer according to Example 12.

1.95 kg of polypropylene were obtained, corresponding to 39 kg of polymer/mmol Zr·h (see table for further data).

EXAMPLE 26

80 cm$^3$ of cyclopentane, dissolved in 800 ml of diesel oil (boiling point 100°–120° C.), were initially introduced into a 1.5 dm$^3$ reactor and the reactor was charged with 60 mmol of a toluene solution of methylaluminoxane and 0.01 mmol of metallocene polymer according to Example 8. After polymerization for 2 h at 60° C., the reaction was stopped using methanol; the resulting polymer was filtered off and dried. The yield was 6.2 g, corresponding to 0.31 kg of polymer/mmol Zr·h.

EXAMPLE 27

600 cm$^3$ of a diesel oil fraction (b.p.: 100°–120° C.) and 300 cm$^3$ of cyclopentene were initially introduced into a 1.5 dm$^3$ reactor and heated to 60° C. The reactor was charged with 60 mmol of a toluene solution of methylaluminoxane and 0.01 mmol of metallocene polymer according to Example 2. After injecting ethylene to a pressure of 7 bar, the batch was polymerized for 2 h, the polymer solution was then added to an acetone/methanol mixture and the cyclopentene/ethylene copolymer was isolated and dried. The yield was 97.6 g, corresponding to 4.88 kg of copolymer/mmol Zr·h (see table for further data).

EXAMPLE 28

A 1.5 dm$^3$ polymerization reactor was flushed with nitrogen and then with ethylene and filled with a solution of 25 g of norbornene in 750 cm$^3$ of toluene. The reactor was then brought to 25° C., with stirring, and 1 bar ethylene was injected.

20 mmol of a toluene solution of methylaluminoxane were then added to the reactor and the reaction mixture was stirred for 15 min, the ethylene pressure being kept at 1 bar by metering in further ethylene.

In parallel with this, 0.05 mmol of metallocene polymer according to Example 12 were added to 10 mmol of the toluene solution of methylaluminoxane and preactivated by leaving to stand for 15 minutes.

This mixture was then metered into the reactor and the reaction mixture was polymerized for 1 h at 25° C., with stirring, the ethylene pressure being kept at 1 bar. The contents were then run off into a vessel containing 100 cm$^3$ of isopropanol and 2 dm$^3$ of acetone were added to the mixture, the resulting mixture was stirred for 10 min and the suspended polymer solid was separated off. The solid was then stirred for 2 h in an alkaline ethanol solution and the polymer was filtered off and dried for 10 h at 80° C. under vacuum. 19 g of copolymer were obtained, corresponding to 0.3 kg/mmol Zr·h (see table for further data)

Abbreviations:

| Cp = | cyclopentadienyl | Me = | methyl |
| THF = | tetrahydrofuran | Et = | ethyl |
| MAO = | methylaluminoxane | RT = | room temperature |
| | | VI = | viscosity index |

TABLE

Olefin (co)polymerization using metallocene monomers and polymers

| Example | Catalyst from Example [mmol]; | No. | MAO [mmol Al] | Temp. [°C.] | Polymerization time [h] | Yield [g] | Activity [kg/mmol Zr · h] | VI [cm$^3$/g] |
|---|---|---|---|---|---|---|---|---|
| 16 | 0.001; | 1 | 13 | 70 | 2 | 82.7 | 41.4 | 529 |
| 17 | 0.001; | 4 | 13 | 70 | 2 | 78.9 | 39.5 | 527 |
| 18 | 0.001; | 7 | 13 | 70 | 2 | 72 | 36 | 707 |
| 19 | 0.0005; | 10 | 13 | 70 | 2 | 27.1 | 27.1 | 680 |
| 20 | 0.0005; | 8 | 13 | 70 | 2 | 52.6 | 52.6 | 620 |
| 21 | 0.0002; | 9 | 13 | 70 | 2 | 32.2 | 80.5 | 671 |
| 22 | 0.001; | 14 | — | 70 | 2 | 63.7 | 31.9 | 477 |
| 23 | 0.001; | 15 | — | 70 | 2 | 68 | 34 | 468 |
| 24 | 0.05; | 6 | 60 | 70 | 1 | 2390 | 47.8 | 43 |

TABLE-continued

Olefin (co)polymerization using metallocene monomers and polymers

| Example | Catalyst from Example [mmol]; | No. | MAO [mmol Al] | Temp. [°C.] | Polymerization time [h] | Yield [g] | Activity [kg/mmol Zr·h] | VI [cm³/g] |
|---|---|---|---|---|---|---|---|---|
| 25 | 0.05; | 12 | 60 | 70 | 1 | 1950 | 39 | 39 |
| 26 | 0.01; | 8 | 60 | 60 | 2 | 6.2 | 0.31 | a) |
| 27 | 0.01; | 2 | 60 | 60 | 2 | 97.6 | 4.88 | 225 |
| 28 | 0.05; | 12 | 30 | 25 | 1 | 19 | 0.3 | 25 | a) Sparingly soluble polymer

We claim:

1. A process for the preparation of an immobile metallocene catalyst component, wherein a metallocene of formula I

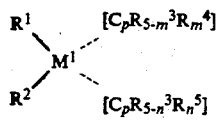

and/or of formula II

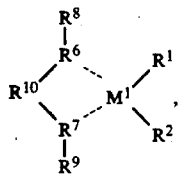

in which

M¹ is zirconium or hafnium and

Cp is a cyclopentadienyl radical,

R¹ and R² are identical or different and are a hydrogen atom, a halogen atom, a $C_1$–$C_{10}$-alkyl group, a $C_1$–$C_{10}$-alkoxy group, a $C_7$–$C_{20}$-arylalkyl group, a $C_6$–$C_{10}$-aryl group or a $C_6$–$C_{10}$-aryloxy group, and R¹ and R² can also be linked to one another and together with M¹ can form a metallo ring, the radicals R³ are identical or different and are a hydrogen atom, a halogen atom, a $C_1$–$C_{10}$-alkyl group, a $C_6$–$C_{10}$-aryl group, a $C_7$–$C_{20}$-arylalkyl group, a $C_1$–$C_{10}$-fluoroalkyl group or an organometallic radical, such as $C_1$–$C_{10}$-trialkylsilyl, $C_6$–$C_{10}$-aryl-$C_1$–$C_{10}$-dialkylsilyl, $C_1$–$C_{10}$-alkyl-$C_6$–$C_{10}$-diarylsilyl or $C_6$–$C_{10}$-triarylsilyl, R⁴ and R⁵ are identical or different and are a vinyl group, a $C_6$–$C_{18}$-arylvinyl group, a $C_1$–$C_8$-alkylvinyl group or a $C_6$–$C_{18}$-vinylaryl group, all of which may be substituted, R⁷ and R⁷ are identical or different and are a cyclopentadienyl, indenyl or fluorenyl radical, it being possible for said rings together with M¹ to form a sandwich structure, R⁸ and R⁹ are identical or different, are substituents of R⁶ and R⁷ and have the meanings given for R³, R⁴ and R⁵, with the proviso that R⁶ and R⁷ can be monosubstituted or polysubstituted by R⁸ or R⁹, but at least one ring R⁶ or R⁷ must carry at least one radical R⁸ or R⁹ having the meaning of R⁴ and R⁵, and R¹⁰ has the meaning shown in formulae III–VII

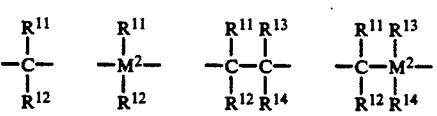

where

M² is silicon, germanium or tin and

R¹¹, R¹², R¹³ and R¹⁴ are identical or different and are a hydrogen atom, a halogen atom, a $C_1$–$C_{10}$-alkyl group, a $C_1$–$C_{10}$-fluoroalkyl group, a $C_6$–$C_{10}$-aryl group, a $C_6$–$C_{10}$-fluoroaryl group, a $C_1$–$C_{10}$-alkoxy group, a $C_6$–$C_{10}$-aryloxy group or a $C_7$–$C_{20}$-arylalkyl group, R¹¹ and R¹², R¹³ and R¹⁴, R¹¹ and R¹³ or R¹² and R¹⁴ together with the atoms linking them can form a ring system and m and n are identical or different and are a number from 0 to 5, where m+n must be ≧1, is homopolymerized or copolymerized, or a compound of formula I and/or of formula II is copolymerized with a (di)vinyl-aromatic compound.

2. The process as claimed in claim 1, wherein, in formulae I and II,

R¹ and R² are identical or different and are a hydrogen atom, a halogen atom, a $C_1$–$C_4$-alkyl group, a $C_1$–$C_4$-alkoxy group, a $C_7$–$C_{14}$-arylalkyl group, a $C_6$–$C_{10}$-aryl group or a $C_6$–$C_{10}$-aryloxy group, and R¹ and R² can also be linked to one another and together with M¹ can form a metallo ring, the radicals R³ are identical or different and are a hydrogen atom, a halogen atom, a $C_1$–$C_4$-alkyl group, a $C_6$–$C_{10}$-aryl group, a $C_7$–$C_{14}$-arylalkyl group, a $C_1$–$C_6$-fluoroalkyl group or an organometallic radical, such as $C_1$–$C_{10}$-trialkylsilyl, $C_6$–$C_{10}$-aryl-$C_1$–$C_6$-dialkylsilyl, $C_1$–$C_4$-alkyl-$C_6$–$C_{10}$-diarylsilyl or $C_6$–$C_{10}$-triarylsilyl, R⁴ and R⁵ are identical or different, preferably identical, and are a vinyl group, a $C_6$–$C_{18}$-arylvinyl group, a $C_1$–$C_8$-alkylvinyl group or a $C_6$–$C_{18}$-vinylaryl group, which groups may be substituted by a $C_1$–$C_4$-alkoxy group, $C_1$–$C_4$-alkyl group or OH group, R⁶ and R⁷ are identical or different and are a cyclopentadienyl, indenyl or fluorenyl radical, it being possible for said rings together with M¹ to form a sandwich structure, $R^8$ and $R^9$ are identical or different, are substituents of $R^6$ and $R^7$ and have the meanings given for $R^3$, $R^4$ and $R^5$, with the proviso that $R^6$ and $R^7$ can be monosubstituted or polysubstituted by $R^8$ or $R^9$, but at least one ring $R^6$ or $R^7$ must carry at least one radical $R^8$ or $R^9$ having the meaning of $R^4$ and $R^5$, and $R^{10}$ has the meaning shown in formulae III-VII, where $M^2$ is silicon or germanium and $R^{11}$, $R^{12}$, $R^{13}$ and $R^{14}$ are identical or different and are a hydrogen atom, a halogen atom, a $C_1$-$C_6$-alkyl group, a $C_1$-$C_6$-fluoroalkyl group, a $C_6$-$C_{10}$-aryl group, a $C_6$-$C_{10}$-fluoroaryl group, a $C_1$-$C_6$-alkoxy group, a $C_6$-$C_{10}$-aryloxy group or a $C_7$-$C_{14}$-arylalkyl group, $R^{11}$ and $R^{12}$, $R^{13}$ and $R^{14}$, $R^{11}$ and $R^{13}$ or $R^{12}$ and $R^{14}$ together with the atoms linking them can form a ring system, and m and n are identical or different and are a number from 0 to 5, where m+n must be $\geq 1$.

3. The process as claimed in claim 1, wherein, in formulae I and II, $R^1$ and $R^2$ are identical or different and are a hydrogen atom, a halogen atom, a $C_1$-$C_4$-alkyl group or a $C_6$-$C_{10}$-aryl group, and $R^1$ and $R^2$ can also be linked to one another and together with $M^1$ can form a metallo ring, the radicals $R^3$ are identical or different and are a hydrogen atom, a halogen atom, a $C_1$-$C_4$-alkyl group, a $C_6$-$C_{10}$-aryl group or an organometallic radical, such as $C_1$-$C_{10}$-trialkylsilyl, $R^6$ and $R^7$ are a cyclopentadienyl radical, and $R^{10}$ has the meaning shown in formulae III-V, where $M^2$ is silicon and $R^{11}$, $R^{12}$, $R^{13}$ and $R^{14}$ are identical or different and are a hydrogen atom, a halogen atom, a $C_1$-$C_6$-alkyl group or a $C_6$-$C_{10}$-aryl group, and $R^{11}$ and $R^{12}$, $R^{13}$ and $R^{14}$, $R^{11}$ and $R^{13}$ or $R^{12}$ and $R^{14}$ together with the atoms linking them can form a ring system.

4. The process as claimed in claim 1, wherein the polymerization is initiated by the action of heat or by means of a free radical forming agent.

5. The process as claimed in claim 1, wherein the polymerization is initiated by means of a free radical forming agent.

6. The process as claimed in claim 5, wherein the free radical forming agent is $\alpha,\alpha'$-azo-isobutyronitrile.

* * * * *

UNITED STATES PATENT AND TRADEMARK OFFICE
CERTIFICATE OF CORRECTION

PATENT NO. : 5,262,498
DATED : November 16 1993
INVENTOR(S) : Martin Antberg, er al It is certified that error appears in the above-identified that said Letters Patent is hereby corrected as shown below:

At col. 2, line 5, "$C_pR_{5-m}{}^3R_m{}^4$" should read --$C_pR^3{}_{5-m}R^4{}_m$--.

At col. 2, line 9, "$C_pR_{5-n}{}^3R_n{}^5$ should read -- $C_pR^3{}_{5-n}R_n{}^5$ --.

At col. 2, line 68, "Rare" should read --$R^{14}$ are--.

At col. 5, line 42, "substituent "  "" should read --substituent "\"--.

At col. 7, line 44, "$J_{cis}32\ 11$" should read --$J_{cis} = 11$--.

At col. 9, line 68, "$(C_6F_{54})$" should read --$(C_6F_5)_4$--.

In claim 1, at col. 13, line 21, "$C_pR_{5-m}{}^3R_m{}^4$"

should read --$C_pR^3{}_{5-m}R^4{}_m$--.

UNITED STATES PATENT AND TRADEMARK OFFICE
CERTIFICATE OF CORRECTION

PATENT NO. : 5,262,498
DATED : November 16 1993
INVENTOR(S) : Martin Antberg, er al It is certified that error appears in the above-identified that said Letters Patent is hereby corrected as shown below:

In claim 1 at col. 13, line 25, "$C_pR_{5-n}{}^3R_n{}^5$"

should read --$C_pR^3{}_{5-n}R^5{}_n$--.

In claim 1 at col. 13, line 57, "$R^7$ and $R^7$" should read --$R^6$ and $R^7$--.

Signed and Sealed this

First Day of November, 1994

Attest:

BRUCE LEHMAN

*Attesting Officer*   *Commissioner of Patents and Trademarks*